United States Patent [19]

Okuyama et al.

[11] Patent Number: 4,486,824
[45] Date of Patent: Dec. 4, 1984

[54] PWM CONVERTER WITH CONTROL CIRCUIT RESPONSIVE TO MINIMUM HOLDING CURRENT

[75] Inventors: Toshiaki Okuyama, Ibaraki; Yuzuru Kubota; Hiroshi Nagase, both of Hitachi, all of Japan

[73] Assignee: Hitachi, Ltd., Tokyo, Japan

[21] Appl. No.: 356,923

[22] Filed: Mar. 10, 1982

[30] Foreign Application Priority Data

Mar. 11, 1981 [JP] Japan ................. 56-33940

[51] Int. Cl.³ .......................... H02M 7/515
[52] U.S. Cl. ........................ 363/41; 363/96; 363/137
[58] Field of Search .......... 363/41, 42, 96, 137, 363/37, 129; 307/252 C; 318/801–803, 811

[56] References Cited

U.S. PATENT DOCUMENTS 3,710,229  1/1973  Jessee ................. 363/41

FOREIGN PATENT DOCUMENTS 53-36635  4/1978  Japan ................. 363/37
53-39430  4/1978  Japan ................. 363/37

OTHER PUBLICATIONS

J. Fac. Eng. Ibaraki Univ., (Japan), No. 28, pp. 1–7, 9-8-80, 51809-0033.
Conference Record of the Industry Applications Society, IEEE-IAS, 1981, MTG, Phila., Pa., USA, pp. 1208–1215, 52030-0074, (5–9 Oct. '81).
Proceedings of the First Annual Int. Motorcon '81 Conference, Chicago, Ill., USA, (10–13 Jun. '81), pp. 483–491, 52133-0081.
IEEE Transactions on Industry Applications, vol. 1A-15, No. 6, pp. 670–675, Nov./Dec., 1979.

*Primary Examiner*—William H. Beha, Jr.
*Attorney, Agent, or Firm*—Antonelli, Terry & Wands

[57] ABSTRACT

In a converter comprising gate turn-off thyristors, a current at an A.C. part of the converter is detected and a polarity of the detected current and a magnitude of the detected current is checked to determine if it is below a holding current level for maintaining the gate turn-off thyristors on. If the detected current is below the holding current level, a pulse width modulated signal is produced as a gate signal. If the detected level is above the holding current level, a short duration pulse synchronized with a rise and a fall of the pulse width modulated signal is produced as the gate signal. The gate signal is supplied to only those of the gate turn-off thyristors which correspond to the polarity of the detected current.

16 Claims, 6 Drawing Figures

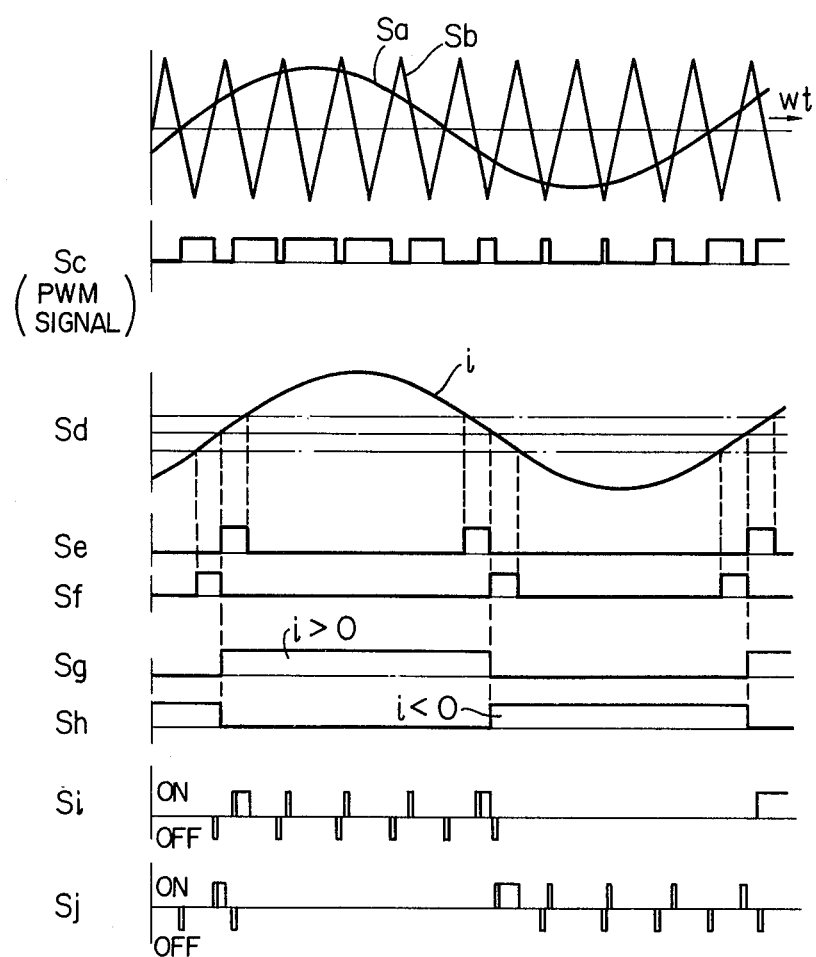

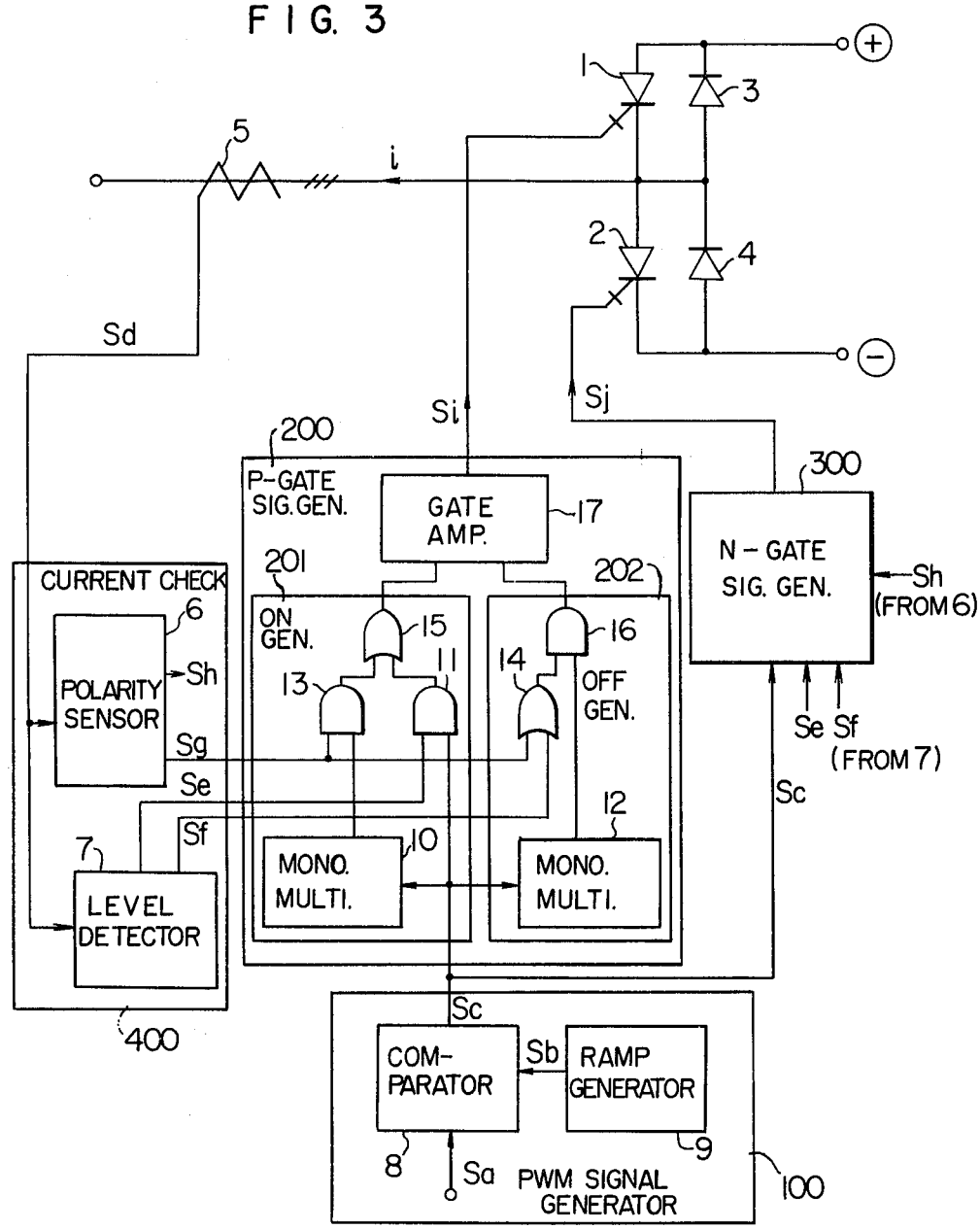

PWM CONVERTER WITH CONTROL CIRCUIT RESPONSIVE TO MINIMUM HOLDING CURRENT

BACKGROUND OF THE INVENTION

1. Field of the Invention

The present invention relates to method and apparatus for controlling a pulse width modulated (PWM) converter. The term converter herein used means a power converter from A.C. to D.C. and a power converter from D.C. to A.C. (usually called an inverter).

2. Description of the Prior Art

A pulse width modulated (PWM) converter has been well known. For example, "Toshiba Review" Vol. 35, No. 12, pages 1054–1056, shows a PWM inverter using power transistors and "Hitachi Review" Vol. 60, No. 6, pages 29–34, shows an inverter using gate turn-off (GTO) thyristors. A semiconductor device having a self-turn-off function such as GTO thyristor can be turned on by a short duration on-gate signal pulse if a current flowing therethrough is above a holding current level and the conduction state is maintained after the removal of the gate bias. In the past, however, an on-gate signal is supplied continuously during a period from the time of turn-on to the time of turn-off even under the holding condition. This results in a power loss and a required increase of power capacity in a gate circuit. It is known that an assembly of devices including a switching device (e.g. GTO thyrister) and devices in a control apparatus for generating a firing signal exhibit a large power loss when they are switched on and off but that once they are conducted they require only a small power loss. During the conduction period, however, they are normally powered by a power supply. As a result, the apparatus is of large size and dissipates extra power.

SUMMARY OF THE INVENTION

It is an object of the present invention to provide improved method and apparatus for controlling the PWM converter.

It is another object of the present invention to provide method and apparatus for controlling the converter with a reduced number of gate signals.

It is a further object of the present invention to provide method and apparatus for controlling the converter with a smaller power consumption.

According to one aspect of the present invention, a magnitude and a polarity of a current from an A.C. part of the converter are sensed, and gate signals supplied to semiconductor devices of the converter are controlled in accordance with the detection results.

The other objects and features of the present invention will be apparent from the following description of the present invention.

BRIEF DESCRIPTION OF THE DRAWINGS

FIG. 3 shows one embodiment of the present invention.

FIG. 4 shows a time chart for explaining the operation of the embodiment shown in FIG. 3.

DETAILED DESCRIPTION OF THE PREFERRED EMBODIMENTS

The present invention will now be explained in detail with reference to the accompanying drawings.

Figure 1:
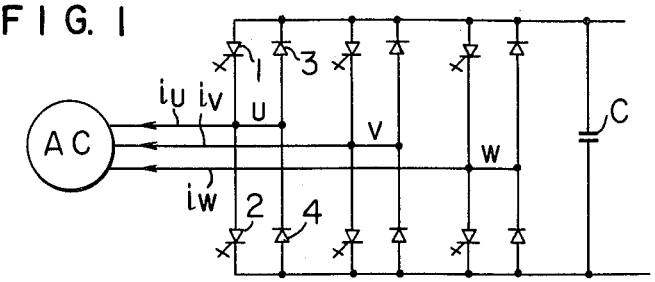
FIG. 1 shows a configuration of a main circuit of a pulse width modulated converter.

FIG. 1 shows a configuration of a main circuit of a PWM converter which is connected to a 3-phase A.C. source. GTO thyristors are used as the switching semiconductor devices. The converter is constructed in a 3-phase bridge circuit. A one-phase section thereof comprises a series-connected arm including GTO thyristors 1 and 2 and diodes (freewheel diodes) 3 and 4 connected in parallel with and in opposite polarity to the respective GTO thyristors 1 and 2. The A.C. source AC is connected to the junction of the GTO thyristors in each arm and the respective arms are connected in parallel. Symbol C denotes a smoothing capacitor for eliminating ripples. The A.C. source AC may be an A.C. motor or an A.C. power supply. When a D.C. output is to be produced from the output of the converter, the A.C. source AC is the A.C. power supply and the D.C. output is produced across D.C. terminals. When the A.C. motor is to be controlled by the output of the converter, the A.C. source A.C. is the A.C. motor and a D.C. power source (not shown) is connected to the D.C. terminals of the converter. In the following description, the converter is assumed to serve as an inverse converter, i.e. inverter, for producing an A.C. output for the sake of convenience of explanation. Accordingly, AC is an A.C. load and three-phase currents $i_u$, $i_v$ and $i_w$ are supplied from U, V and W-phases to the load.

Figure 2A:
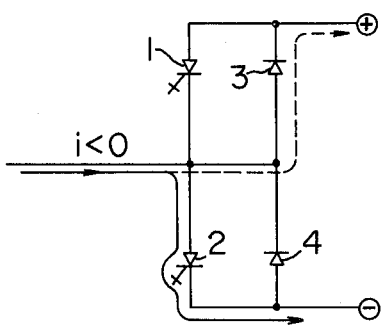
FIGS. 2a and 2b illustrate a principle of operation of the present invention.
Figure 2B:
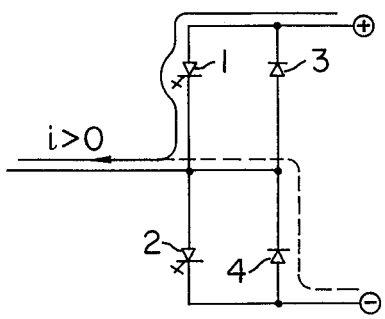

FIGS. 2a and 2b illustrate the operation of the converter shown in FIG. 1. Since all of the phases (U, V and W-phases) operate in the same way, only the U-phase is illustrated. By turning on and off the GTO thyristors 1 and 2, a status in which the GTO thyristor 2 or the diode 3 conducts and a status in which the GTO thyristor 1 or the diode 4 conducts is presented. It will be apparent that when the current is reversed (e.g. i>0 in FIG. 2a), the parallel diode (e.g. diode 4) to the turned-on thyristor conducts. In those status, a duty factor is controlled. That is, the PWM control is effected. Through the PWM control, the magnitude and the phase of the output voltage of the converter can be controlled to control the output current i supplied to the A.C. load (e.g. A.C. motor) as required. Which one of the GTO thyristors 1 and 2 (or the diodes 4 and 3) conducts depends on the direction of the A.C. current i and to which one of the GTO thyristors 1 and 2 the on-gate signal is applied. If the A.C. current i of the converter is smaller than zero (i<0), that is, if the A.C. current i flows from the A.C. terminal to the D.C. terminal, the GTO thyristor 2 conducts as shown in FIG. 2a, and if the A.C. current i is larger than zero (i>0), that is, if the A.C. current i flows from the D.C. terminal to the A.C. terminal, the GTO thyristor 1 conducts as shown in FIG. 2b.

The GTO thyristor maintains the turned-on state even if the duration of the pulse applied as the on-gate signal is short so long as the conduction current is above the holding current level. Thus, the turn-on signal need not be continuously supplied so long as the conduction current of the GTO thyristor is above the holding current level.

Accordingly, in the present invention, the magnitude and the polarity of the conduction current are sensed to control the on-gate signal in order to prevent unnecessary application of on-gate signal to the GTO thyristor.

FIG. 3 shows one embodiment of the present invention. Again, only a one-phase section is shown and other phase circuits are omitted. In FIG. 3, numerals 1 and 2 denote the GTO thyristors and numerals 3 and 4 denote the diodes. Numeral 5 denotes a current detector (e.g. a current transformer), numeral 6 denotes a current polarity sensor, numeral 7 denotes a current level detector for detecting if the current is below the holding current level or not, numeral 8 denotes a comparator which produces a pulse width modulated signal Sc, numeral 9 denotes a ramp or triangle wave generator, and numerals 10 and 12 denote monostable multivibrators (e.g. one-shot multivibrators). The monostable multivibrator 10 generates a short duration pulse of a predetermined pulse width in synchronism with a rise of the output signal from the comparator 8 while the monostable multivibrator 12 generates a short duration pulse of a predetermined pulse width in synchronism with a fall of the output signal from the comparator 8. The output pulse from the monostable multivibrator 10 is used as the on-gate signal to turn on the GTO thyristor while the output pulse from the monostable multivibrator 12 is used as the off-gate signal to turn off the GTO thyristor. Numerals 11 and 13 denote AND circuits, numeral 15 denotes an OR circuit, numeral 14 denotes an OR circuit, numeral 16 denotes an AND circuit and numeral 17 denotes a gate amplifier which amplifies the output (on-gate signal) from the OR circuit 15 and the output (off-gate signal) from the AND circuit 16 to produce a gate signal Si to the GTO thyristor 1. The circuits 10, 11, 13 and 15 form an on-gate signal generator 201 for generating the on-gate signal. The circuits 12, 14 and 16 form an off-gate signal generator 202 for generating the off-gate signal. The circuits 201, 202 and 17 form a P-gate signal generator 200 which generates the gate signal Si for controlling the positive side GTO thyristor 1. Numeral 300 denotes an N-gate signal generator which generates a gate signal Sj for controlling the negative side GTO thyristor 2. The generator 300 is constructed in the similar way as the P-gate signal generator 200 and the detail thereof is omitted. Numeral 100 denotes a pulse width modulation (PWM) signal generator. Numeral 400 denotes a current check circuit comprising the detectors 6 and 7.

The operation of the present embodiment is now explained. A voltage instruction Sa to change the output voltage is a sine wave signal and is applied to the comparator 8. The ramp wave generator 9 generates a triangle wave signal Sb, which is applied to the comparator 8. The comparator 8 produces a PWM signal Sc by comparing the magnitudes of the signals Sa and Sb. The PWM signal has a modulated pulse width which corresponds to the height (voltage) of the voltage instruction Sa. The PWM signal Sc is applied to the generators 200 and 300. In the P-gate signal generator 200, the signal Sc is applied to the monostable multivibrators 10 and 12 and the AND circuit 11. On the other hand, an A.C. current Sd detected by the current detector 5 is applied to the current polarity sensor 6 and the current level detector 7. The current polarity sensor 6 produces a signal Sg when the signal Sd or the current i is positive (i>0) and produces a signal Sh when the current i is negative (i<0). The current level detector 7 produces signals Se and Sf when the signal Sd is within a range corresponding to a conduction current below the holding current level of the GTO thyristor. When the holding current level is $\pm I_H$, the signal Se remains at a constant level for a period when $0 < i < +i_H$, and the signal Sf remains at a constant level for a period when $-i_H < i < 0$. The waveforms of those signals Sa, Sb, Sc, Sd, Se, Sf, Sg and Sh are illustrated in FIG. 4, which exemplifies an inductive motor control. The monostable multivibrator 10 generates the short duration pulse in response to the rise of the PWM signal. Thus, the short duration pulse is supplied to the gate amplifier 17 for a period when the signal Sg remains at the constant level, that is, in the period of i>0. In the period of i<0, the output (off-gate signal) from the circuit 12 is supplied to the amplifier 17. During the time period in which the current i is positive (i>0) and the signal Sd is below the holding current level (the Se-on period), the GTO thyristor 1 cannot maintain the on state merely by the on-gate signal at the output of the monostable multivibrator 10. Accordingly, a long duration pulse by the PWM signal Sc is supplied to the amplifier 17 only for the Se-on period. In the period of i>0 (Sg on period), the P-gate signal generator 200 generates the gate signal Si. In the period of i<0 (Sh-on period), the N-gate signal generator 300 generates the gate signal Sj to control the GTO thyristor 2. During the period of i<0, the P-gate signal generator 200 produces the gate signal Si only in the Sf-on period and when the monostable multivibrator 12 generates the off-gate signal. In order to prevent a shortcircuit fault in which the GTO thyristor 2 is turned on while the GTO thyristor 1 is also on, the pulse is produced to positively turn off the GTO thyristor 1 at the early stage of the control period of the GTO thyristor 2.

The waveforms of those signals are shown in the time chart shown in FIG. 4. The gate signals Si and Sj are produced by the signals Sa-Sh to control the GTO thyristors 1 and 2. In the gate signals Si and Sj, the positive pulses are the on-gate signals and the negative pulses are the off-gate signals. Periods in which the signals Si and Sj are not on are provided in order to prevent unnecessary pulses from being generated by the signals Sg and Sh. In the on-gate signals Si and Sj, long duration pulses are included among the short duration pulses in order to maintain the GTO thyristors on during the periods in which the GTO thyristors cannot be maintained on by the short duration pulses. The output period of the AND circuit 11 shown in FIG. 3 corresponds to this period. In the present embodiment, the gate signals are generated only for the necessary periods. In the period in which the current is above the holding current level, the gates of the GTO thyristors are controlled by the short duration pulses synchronized with the rise timing of the PWM signal. Accordingly, the power consumed by the control apparatus is reduced and the size of the control apparatus is reduced. The heat loss of the GTO thyristors is also reduced.

Figure 5:
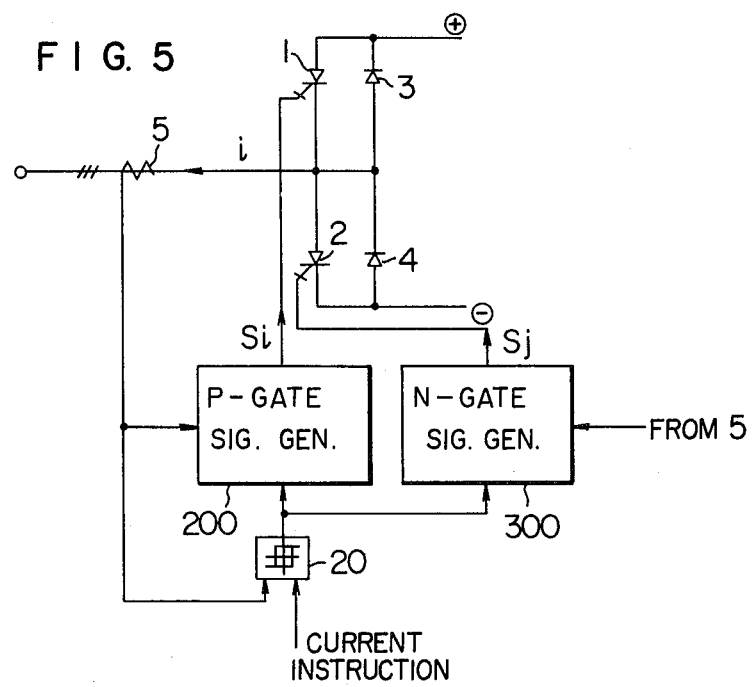
FIG. 5 shows another embodiment of the present invention.

FIG. 5 shows a block diagram of a main portion of another embodiment of the present invention. Like numerals to those shown in FIG. 3 denote the like elements. The present embodiment differs from the embodiment of FIG. 3 in that the comparator 8 and the ramp wave generator 9 are eliminated. A comparator 20 having a hysteresis characteristic is provided to compare an instantaneous value of the output of the current level detector 5 with a current instruction signal to produce the PWM signal Se. Other part of the circuit is same as that of FIG. 3 and the operation is similar to that shown in FIG. 4.

In this manner, the gate signals are generate with a minimum number of elements.

While the A.C. output current is detected in the illustrated embodiment, any current equivalent to the A.C. output current may be detected. For example, a current flowing in the diodes 3 and 4 may be detected.

While the GTO thyristors are used as the switching devices in the illustrated embodiments, it should be understood that other switching devices having similar functions may be used.

We claim:

1. A method for controlling a PWM converter wherein PWM signals are applied to gates of gate turn-off thyristors of the converter as on-gate signals thereto to convert power, comprising the steps of:
   detecting a current at an A.C. part of said converter;
   producing said gate signals to turn on and off said gate turn-off thyristors in accordance with a polarity of the detected current;
   said gate signals being short duration pulses; and
   said on-gate signals of said gate signals in the periods in which said detected signal is below a holding current level required to maintain said gate turn-off thyristors on being longer duration pulses for maintaining the on states of said gate turn-off thyristors.

2. A method for controlling a PWM converter wherein PWM signals are applied to gates of switching devices of the converter as gate signals of a short duration and a longer duration to convert power, comprising the steps of:
   detecting an instantaneous current at an A.C. part of said converter;
   supplying said gate signals to a first group of the switching devices of said converter which are gated to conduct with a positive current only when the detected current is positive to turn on and off said first group of switching devices;
   supplying the gate signals to a second group of the switching devices which are gated to conduct with a negative current only when the detected current is negative to turn on and off said switching devices; and
   said gate signals in the periods in which said detected signal is below a holding current level required to maintain said switching devices on being of said longer duration for maintaining the on states of said switching devices and said gate signals in the periods in which said detected signal is above a holding current level required to maintain said switching devices on being of said short duration for maintaining the on states of said switching devices.

3. A control apparatus for a PWM converter in which gate signals based on a PWM signal are applied to gates of gate turn-off thyristors of said converter, comprising:
   a current detector for detecting a current at an A.C. part of said converter;
   current check means for checking a polarity of the detected current and if a magnitude thereof is below a predetermined level to produce an output signal; and
   gate signal generating means for generating short duration pulses synchronized with rises and falls of said PWM signal as said gate signals in accordance with the output signal of said current check means and said PWM signal except when said detected current is below said predetermined level.

4. A control apparatus for a PWM converter according to claim 3 wherein said current check means includes a current polarity sensor for producing a signal indicative of the polarity of the current and a current level detector for producing a signal when the current level is below the predetermined level.

5. A control apparatus for a PWM converter in which gate signals based on a PWM signal are applied to gates of switching devices of said converter, comprising:
   a current detector for detecting a current at an A.C. part of said converter;
   current check means having a function of producing a polarity signal indicative of a positive or negative polarity of the detected current and a function of checking if the detected current is below a predetermined level and producing a level signal indicative of the check result; and
   gate signal generating means having a function of generating gate signals for driving only those of said switching devices which are associated with the positive or negative polarity current and a function of providing said PWM signal as said gate signal when said level signal indicates that the detected current is below said predetermined level and providing short duration pulses synchronized with rises and falls of said PWM signal as said gate signal when said level signal indicates that the detected current is not below said predetermined level.

6. A control apparatus for a PWM converter according to claim 5 wherein said switching devices are gate turn-off thyristors.

7. A method for controlling a PWM converter wherein PWM signals are applied to gates of switching devices of the converter as gate signals of a short duration and a longer duration to convert power, the switching devices being divided into a first group which conducts when current in an A.C. part of said converter is positive and into a second group which conducts when current in an A.C. part of said current is negative comprising the steps of:
   detecting an instantaneous current at an A.C. part of said converter to determine if said current is positive or negative;
   supplying said gate signals to turn on and off said switching devices in accordance with a polarity of said detected current to allow the first group to conduct only when the detected current is positive to turn on and off said first switching devices, and to allow the second group to conduct only when the detected current is negative to turn on and off said second group of switching devices; and
   said gate signals in the periods in which said detected signal is below a holding current level required to maintain said switching devices on being of said longer duration for maintaining the on states of said switching devices and said gate signals in the periods in which said detected signal is above a holding current level required to maintain said switching devices on being of said short duration for maintaining the on states of said switching devices.

8. A method for controlling a PWM converter wherein PWM signals are applied to gates of gate turn-off thyristors of the converter as on-gate signals thereto to convert power, the gate turn-off thyristors being divided into a first group which conducts when current in an A.C. part of said converter is positive and into a second group which conducts when current in an A.C. part of said current is negative, comprising the steps of:

detecting a current at an A.C. part of said converter to determine if said current is positive or negative;

producing said gate signals to turn on and off said gate turn-off thyristors in accordance with a polarity of the detected current so to cause only said first group of thyristors to conduct when said detected current is positive and only said second group of thyristors to conduct when said detected current is negative;

said gate signals being short duration pulses; and said on-gate signals of said gate signals in the periods in which said detected signal is below a holding current level required to maintain said gate turn-off thyristors on being longer duration pulses for maintaining the on states of said gate turn-off thyristors.

9. A control apparatus for a PWM converter in which gate signals based on a PWM signal are applied to gates of gate turn-off thyristors of said converter, the gate turn-off thyristors being divided into a first group which conducts when current in an A.C. part of said converter is positive and divided into a second group which conducts when current in an A.C. part of said converter is negative, comprising:

a current detector for detecting a current at an A.C. part of said converter;

current check means for checking a polarity of the detected current for causing the conduction of only the first group of thyristors when the detected current polarity is positive and for causing the conduction of only the second group of thyristors when the detected current polarity is negative and if a magnitude thereof is below a predetermined level to produce an output signal; and gate signal generating means for generating short duration pulses synchronized with rises and falls of said PWM signal as said gate signals in accordance with the output signal of said current check means and said PWM signal except when said detected current is below said predetermined level during which period the detected current is below said predetermined level longer duration pulses are produced for maintaining the on state of said gate turn-off thyristors.

10. A control apparatus for a PWM converter according to claim 9 wherein said current check means includes a current polarity sensor for producing a signal indicative of the polarity of the current and a current level detector for producing a signal when the current level is below the predetermined level.

11. A control apparatus for a PWM converter in which gate signals based on a PWM signal are applied to gates of switching devices of said converter, the switching devices being divided into a first group which conducts when the current in an A.C. part of the converter is positive and into a second group which conducts when the current in an A.C. part of the converter is negative, comprising:

a current detector for detecting a current at an A.C. part of said converter;

current check means having a function of producing a polarity signal indicative of a positive or negative polarity of the detected current and a function of checking if the detected current is below a predetermined level and producing a level signal indicative of the check result; and gate signal generating means having a function of generating gate signals for driving only those of said switching devices which are associated with the positive or negative polarity current and a function of providing said PWM signal as said gate signal when said level signal indicates that the detected current is below said predetermined level and providing short duration pulses synchronized with rises and falls of said PWM signal as said gate signal when said level signal indicates that the detected current is not below said predetermined level.

12. A control apparatus for a PWM converter according to claim 11 wherein said switching devices are gate turn-off thyristors.

13. A method for controlling a PWM converter wherein PWM signals are applied to gates of switching devices of the converter as gate signals of a short duration and a longer duration to convert power, comprising the steps of:

detecting a nonintegral function of a time varying current present in an A.C. part of said converter;

supplying said gate signals only to a first group of the switching devices of said converter which are gated to conduct with postive current only when the magnitude of the time varying detected current is positive to turn on and off said switching devices;

supplying the gate signals only to a second group of the switching devices which are gated to conduct with a negative current only when the magnitude of the time varying detected current is negative to turn on and off said switching devices; and said gate signals in the periods in which said detected signal is below a holding current level required to maintain said switching devices on being of said longer duration for maintaining the on states of said switching devices and said gate signals in the periods in which said detected signal is above a holding current level required to maintain said switching devices on being of said short duration for maintaining the on states of said switching devices.

14. A method in accordance with claim 13 wherein said nonintegral function is an instantaneous current present in the A.C. part of said converter.

15. A method for controlling a PWM converter wherein PWM signals are applied to gates of switching devices of the converter as gate signals of a short duration and a longer duration to convert power, the switching devices being divided into a first group which conducts when current in an A.C. part of said converter is positive and into a second group which conducts when current in an A.C. part of said current is negative comprising the steps of:

detecting a nonintegral function of a time varying current present in an A.C. part of said converter to determine if said current is positive or negative to turn on or turn off said switching devices;

supplying said gate signals to turn on and off said switching devices in accordance with a polarity of said detected current to allow the first group to conduct only when the detected current is positive, and to allow the second group to conduct only when the detected current is negative to turn on and turn off said switching devices; and said gate signals in the periods in which said detected signal is below a holding current level required to maintain said switching devices on being of said longer duration for maintaining the on states of said switching devices and said gate signals in the periods in which said detected signal is above a holding current level required to maintain said switching devices on being of said short duration for maintaining the on states of said switching devices.

16. A method in accordance with claim 15 wherein said nonintegral function is an instantaneous current present in the A.C. part of said converter.

* * * * *